Aug. 30, 1966 J. K. PARKS 3,270,315

CORRELATION DEVICE

Filed Feb. 19, 1965 9 Sheets-Sheet 1

INVENTOR.
JERRY K. PARKS
BY
George A. Sullivan
Agent

INVENTOR.
JERRY K. PARKS

BY [signature]
Agent

Aug. 30, 1966 J. K. PARKS 3,270,315

CORRELATION DEVICE

Filed Feb. 19, 1965 9 Sheets-Sheet 3

INVENTOR.
JERRY K. PARKS
BY [signature]
Agent

Aug. 30, 1966 J. K. PARKS 3,270,315

CORRELATION DEVICE

Filed Feb. 19, 1965 9 Sheets-Sheet 4

INVENTOR.
JERRY K. PARKS
BY [signature]
Agent

INVENTOR.
JERRY K. PARKS
BY [signature]
Agent

Aug. 30, 1966 J. K. PARKS 3,270,315

CORRELATION DEVICE

Filed Feb. 19, 1965 9 Sheets-Sheet 6

INVENTOR.
JERRY K. PARKS
BY [signature]
Agent

Aug. 30, 1966 J. K. PARKS 3,270,315

CORRELATION DEVICE

Filed Feb. 19, 1965 9 Sheets-Sheet 7

INVENTOR.
JERRY K. PARKS
BY George Sullivan
Agent

Aug. 30, 1966 J. K. PARKS 3,270,315

CORRELATION DEVICE

Filed Feb. 19, 1965 9 Sheets-Sheet 8

INVENTOR.
JERRY K. PARKS
BY
George A. Sullivan
Agent

INVENTOR.
JERRY K. PARKS
BY [signature]
Agent

United States Patent Office 3,270,315
Patented August 30, 1966

3,270,315

CORRELATION DEVICE

Jerry K. Parks, Los Altos, Calif., assignor to Lockheed Aircraft Corporation, Burbank, Calif.

Filed Feb. 19, 1965, Ser. No. 438,176
15 Claims. (Cl. 340—3)

This application is a continuation-in-part of U.S. application Serial Number 86,808, filed February 2, 1961, and now abandoned.

The present invention relates to methods of performing cross correlation and more particularly to apparatus which stores a wide-band electrical signal, that duplicates this signal for transmission and detects, by cross-correlation, the time of arrival of a signal having the same form as the stored electrical signal.

Prior methods for performing detection by correlation have been by tapped delay lines, linear matched filters realized by lumped constant elements, and shift registers. However, these prior devices have been limited to narrow-band signals due to the extreme complexity required in obtaining wide-band signals. Therefore, only short time periods for integration have been possible, resolution has been limited and the signal to noise ratio has been relatively low.

The present invention obviates the disadvantages of these prior devices by photographically storing a wide-band electrical signal, duplicating the electrical signal so that it may be transmitted and performing the operation of matching and multiplying the stored signal with a received signal.

The primary elements of the present invention include a recording light drum, which is auxiliary equipment, an operating light drum, a signal storage cylinder, means for transmitting the stored signal and means for correlating and integrating the stored signal and the transmitted signal. The signal is stored by exposing and developing a photosensitive coating that has been deposited on the above-mentioned storage cylinder. The exposure is carried out in two steps by placing a blank master cylinder over the recording light drum and revolving either the cylinder or drum through one-half revolution while the electrical signal to be recorded modulates the light intensity within the drum about a bias level. At the end of one-half revolution of the cylinder, the light within the recording drum is no longer modulated and the light intensity is reduced to zero. This procedure completely exposes half of the cylinder surface and after development the cylinder will have two broad helical bands that wrap half way around the cylinder. One broad band will be clear because the light intensity during the last half of the exposure process was zero. The other broad band will comprise a large number of light and dark helical bands that wrap half way around the cylinder. The light and dark helical bands represent points of high and low signal level. A second photosensitized cylinder (referred to as the storage cylinder) is positioned concentrically in close contact with the first cylinder and is exposed through the master cylinder thus making a positive. The two step process is required in order to obtain a linear relationship between the original exposure and the light transmission through the storage cylinder.

The developed storage cylinder is placed over the operating light drum and the cylinder is then caused to rotate at a constant rate. If the light intensity in the drum is set at a contant value and the transmitted light is observed at any point opposite either of two transparent vertical slots in the drum, the fluctuation in light intensity that is observed will represent the recorded signal. If the point of observation is changed along the slot, then the signal will appear but it will be delayed or advanced in time depending upon the direction in which the point of observation is changed. Moving the point of observation from the top of a slot to the bottom of a slot introduces a delay of signal arrival that is equal to one-half the period of the storage drum revolution.

The fluctuating light intensity observed at the top of and then amplified. In sonar operation, for example, sitive means, where it is converted to an electrical signal and then amplified. In sonar operation, for example, the amplified electrical signal is fed to an underwater sound transducer and projected as a sound signal. Immediately thereafter the electrical circuit is switched over to prepare for the reception and detection of the echo signal.

In the detecting mode of operation, the light intensity of the operating light drum is modulated about a biased value by the received sound signal. The echo signals will have essentially the same form as the transmitted signal and the points of high and low intensity will match point for point with the light and dark areas of the storage drum at some observation point on one of the two slots. Integration of the light intensity for the period of the signal at a matching point will give a value larger than any other value observed along the slot provided no other target is present. If other targets are present and additional echo signals are received at different periods of time, integration of these echo signals will result in large values at different points along the slots.

One method of integrating these signals is performed by placing film strips in front of the two slots wherein bright spots on positive film will represent echo signal arrival. By employing two slots, the film strips can be indexed once each revolution of the storage cylinder and yet obtain integration of all signals during the duration of the signals. Target range and detection is uniquely determined by noting the lot at which the bright spot appeared, the position of the bright spot along the slot, and the number of cylinder revolutions that have occurred since the signal was transmitted.

Another method of integration is by replacing the film strips with scanning photocells the outputs of which are displayed on a dual beam cathode ray tube as an intensity, or Z axis, modulation. In this instance the integration is performed by the phosphor on the tube face. Target range and detection is determined by position of the vertical sweep and the position of the target along the vertical sweep.

The signal which is recorded on the drum is a random signal having a uniform power spectrum. A uniform power spectrum is a characterization of sinusoidal components having frequencies of integer multiples and of constant power levels. The summation of the sinusoidal component results in the random signal selected.

The operation performed by the device may be expressed mathematically by:

$$\rho(\tau)=\int_0^T S_1(t)S_2(t+\tau)dt$$

where $\rho(\tau)$ is the integrated light intensity
$\rho$ is the shape of correlation function
$\tau$ is the miss-match time between received signal and stored reference signal
T is the time duration of the recorded signal
$t$ is the actual time
$S_1(t)$ is the received echo signal
$S_2(t+\tau)$ is the stored reference signal The hereinafter described correlation detector that performs the above mathematical operation has the following input-output signal to noise relationship for noise and signals having uniform power spectrum.

$$\left(\frac{PS_e}{PN_n}\right)_{out}=2TW\left(\frac{PS_e}{PN_n}\right)_{in}$$

relationship applies only at $\rho(\tau)=1$, where:

T is the duration of recorded signal
W is the bandwidth of the spectrum of the recorded signal
$P_e$ is the average power in the signal component
$P_n$ is the average power in the noise component $$\frac{PS_e}{PN_{n\,out}}$$

is the output signal to noise power ratio when operating as a detector $$\frac{PS_e}{PN_{n\,in}}$$

is the input signal to noise power ratio when operating as a detector

The above defined signal to noise relationship is applicable at the correlation peak or when $\rho(\tau)$ is equal to unity. To illustrate the effectiveness of the instant device, assume the signal to noise ratio that is received by the hydrophone of a sonar device is equal to .01, that T is equal to one second and that W is equal to ten kilocycles per second. With this set of conditions the signal to noise output would be 200. Since the signal to noise ratio of this device would be 200 it can be seen that integration of the signal and the noise would result in the signal being greatly predominant resulting in a bright signal spot on the film or screen which is not interfered with by noise.

As it will hereinafter become more apparent, the target resolution of the instant device is directly proportional to the signal bandwidth. It has been found that highly satisfactory resolution is obtained at $1/W$ where W is the signal bandwidth. For example, with a bandwidth of ten kilocycles per second and the speed of sound in water being approximately 5,000 feet per second, clear resolution at .5 foot would be obtained. It can therefore be seen that target recognition could be readily obtained by means of the instant device.

The particular bandwidth employed may be obtained by selecting a random signal which has a uniform power spectrum and a given bandwidth. In the alternative, the selected signal may be reproduced over durations of either greater or lesser periods of time by changing the correlator drum speed and thereby changing the bandwidth. The bandwidth of the transmitted signal and thus the range of resolution of the detector can be readily controlled. Increased speed of rotation of the drum would result in increased bandwidth which would in turn result in high range resolution, whereas low speed of revolution would result in low range resolution. It can therefore be seen that the device has the capabilities of high range resolution and capabilities of studying sound echoes returned from various parts of a target having depth in range and thus has capabilities of target recognition.

When the present invention is used for communication, the reference signal is delay modulated by a predetermined coding system and then transmitted. The signal is received and then decoded by a correlator having the same recorded reference signal. This provides an extremely secure method of communication and also makes it possible to have a great number of channels since it is possible to select a great number of random signals as well as time periods over which these random signals are transmitted.

An object of the present invention is to provide a method of detection by cross-correlation.

Another object is to provide a device which is capable of target recognition by cross-correlation.

Another object is to provide a device which is capable of resolution of about .5 foot by cross-correlation.

Another object is to provide a method for storing a signal, transmitting the stored signal and detecting by cross-correlating the reflected transmitted signal and the stored signal.

Another object is to provide a device which photographically stores a wide-band electrical signal, duplicates the stored signal and compares the echo of the duplicated signal with the stored signal by cross-correlation thereby determining the time between transmission of the duplicated signal and receipt of the echo signal.

Another object is to provide a device which receives a random echo signal, correlates this echo signal with the same random reference signal, discriminates against noise and integrates the product of the echo and reference signals.

Another object is to provide a device for communication by cross-correlation.

The specific nature of the invention, as well as other objects, uses and advantages thereof, will clearly appear from the following description and from the accompanying drawing in which:

FIGURE 1, plots A through G, represents the random signal and the components thereof which are employed in the present invention.

FIGURE 2, plots A through G, represents the multiplication, and integration of the reference, noise and echo signals of the present invention.

The basic operation of the present invention can be best understood and demonstrated by the following mathematical analysis wherein:

$$E_o(\tau)=\int_0^T[s(t)+n(t)]s(t+\tau)dt \tag{1}$$

where $E_o(\tau)$ represents the integrated light intensity of both the signal and the noise, $s(t)$ represents the received echo signal, $n(t)$ represents the received noise signal, $s(t+\tau)$ represents the stored reference signal, $\tau$ represents the miss-match time between the received echo signal and the stored reference signal, $t$ represents the actual time at which integration occurs, T represents the time duration of the recorded signal and $E_o$ represents the shape of the correlation function.

The relationship $s(t)$ in Equation 1 may be further defined as $$\sum_{n=f_a}^{n=f_u} C_n \cos(n\omega t+\phi_n) \tag{2}$$

where $C_n$ is the coefficient representing the amplitude of the sine waves (which are hereinafter defined with relation to the uniform power spectrum), $n$ represents integer frequency of the sine wave in question of the uniform power spectrum, $\omega$ is $2\pi/T$ (where T is as above defined), $\phi_n$ is the phase constant and $f_a$ and $f_u$ are the frequency limits of the uniform power spectrum.

Figure 1:
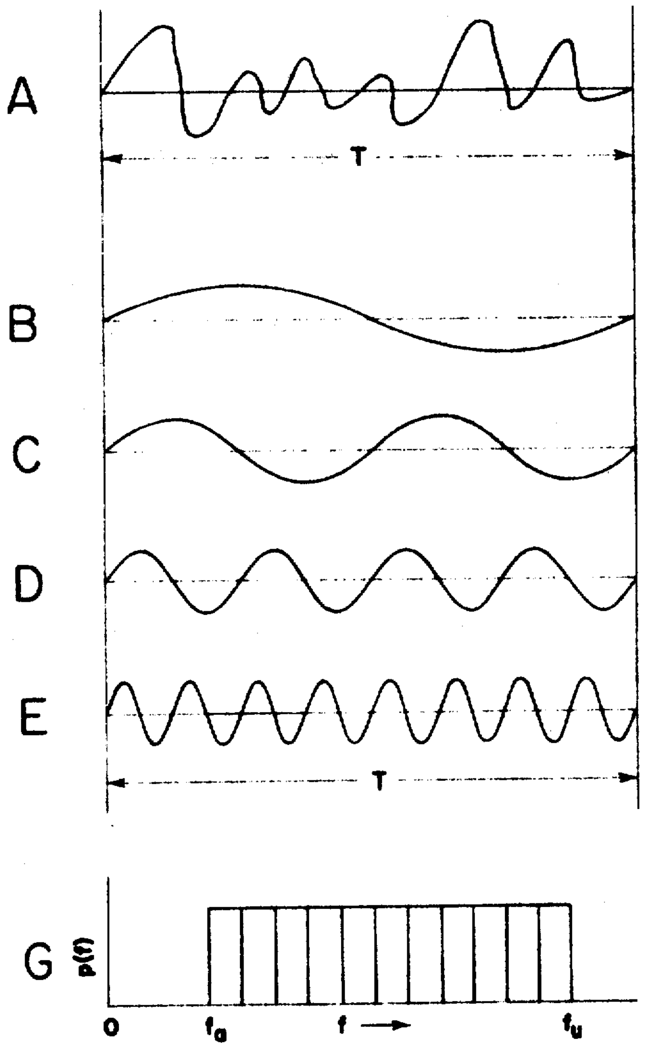

Referring to FIGURE 1, the curve represented by plot A is the random signal which is recorded on the cylinder over time period T. The oscillation of this random signal varies both in amplitude and period and in practice consists of many more oscillations than are shown. It has been found that one thosuand oscillations produce satisfactory results; however, it is to be understood that this value may be appreciably varied. The curves represented in plots B, C, D and E represent sine waves having the same power levels and having integer frequency separation. In practice the frequency range of these sine waves are from about 1 kc. to about 10 kc. The curve represented by plot G denotes the uniform power spectrum which is a characterization of the sinusoidal components of plots B, C, D and E. It may be assumed the curves of plots B and E respectively represent frequencies $f_a$ and $f_u$ of the uniform power spectrum of plot G and plots C and D represent frequencies intermediate of $f_a$ and $f_u$. The summation of the sinusoidal components of plot G (the uniform power spectrum) or of plots B, C, D and E results in the random noise shown in plot A. Uniform power spectrum random noise generators are conventional and the operation thereof is therefore not described. To obtain the proper correlation function as above and hereinafter defined it is necessary that the power spectrum be uniform as best depicted in plot G of FIGURE 1.

In order that a detection device be effective it is mandatory that the effect of random noise (other than the signal) be discriminated against. As will hereinafter become apparent, the random noise term, $n(t)$ of Equation 1, will effectively drop out wherein the operation of the present invention can be represented mathematically by:

$$\rho(\tau)=\int_0^T s(t)s(t+\tau)dt \qquad (3)$$

where $\rho(\tau)$ represents the integrated light intensity of only the signal and remaining terms are as defined in Equation 1.

Figure 2:
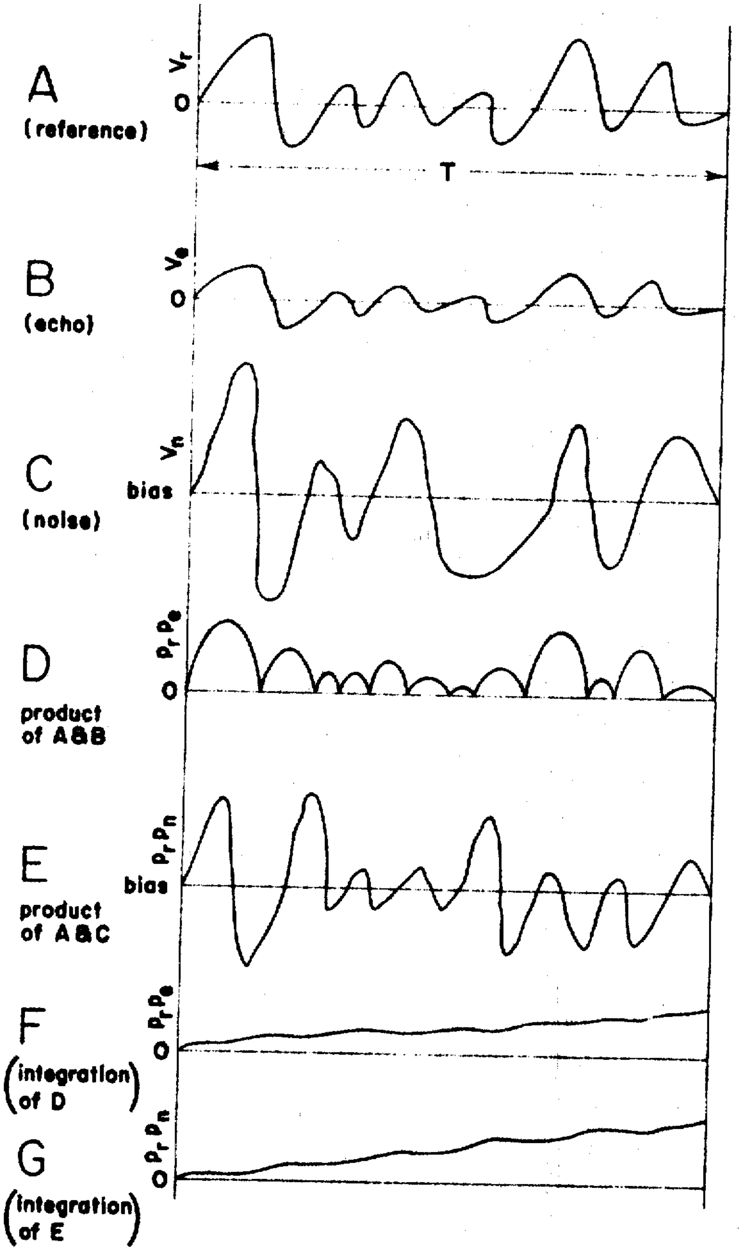

In order to more clearly understand why the noise term is effectively eliminated, reference is directed to FIGURE 2 wherein plot A represents the reference signal (recorded on drum), B represents the echo signal (received by the hydrophone), C represents the noise signal (received by the hydrophone and superposed on a bias), D represents the product of A and B (performed by the device), E represents the product of A and C (performed by the device), F represents the integration of D (performed by the device) and G represents the integration of E (performed by the device). As set forth in Equation 1, the device also sums F and G.

By comparing the curves of plots A and B it can be seen that the echo signal has the peaks, cross over points and the same sign at the same time as that of the reference signal (which is stored on the drum). That is, the reference and echo signals are correlated. This being the case, the product of A and B, as represented by the curve of plot D, will result in a positive sign and a positive product irrespective of whether the signal and echo are positive or negative at the instant of multiplication. As will hereinafter become apparent, a slight time shift between the echo and reference will result in very rapid attenuation of the A and B product as well as the integration of this product. It has been experimentally observed that the use of a peak clipper in the received signal channel of a cross correlator has little effect on the correlation process. The use of such a clipper in the instant device will reduce the required level of light bias and consequently the grey level on the exposed film can be made darker.

By comparing the curves of plots A and C it can be seen that both the noise (plot C) and the reference (plot A) signals are random. However, the random noise signal has entirely different characteristics than the reference signal because the probability of duplicating a selected random signal is practically zero and especially since the reference signal is selected to have the order of one thousand oscillations. The reference and noise signals are therefore uncorrelated. Plot E represents the product of A and C and it can be seen that the product is both positive and negative and occupies an almost equal area above and below the reference line. In practice, the noise signal is much larger than the echo and reference signals.

The curves of plots F and G respectively show the integration of the curves of plots D and E. From this it can be seen that since multiplication of the correlated reference and echo signals results in only a positive value that integration results in relatively large finite output that increases with time. It can also be seen that there is multiplication of the reference and noise signals but since they are uncorrelated the product is both positive and negative and has an average value that approaches zero and will be zero when T is infinity. Consequently the output noise does not increase with time; however, the D.C. bias, upon which the output noise is superposed, increases with time as does the output signal as illustrated in plot E. In practice the film is selected so there will only be slight exposure due to the integration of the D.C. bias and the correlated signal is integrated and superposed thereupon resulting in a bright spot on the film surface. The contribution to the output by the $s(t)$ term of Equation 1 can be made large compared to the contribution of the $n(t)$ term by choosing T and W large. For these conditions Equation 1 may be written as Equation 3. It should be noted that the above analysis takes place at the correlation point of $\rho(\tau)=1.0$ and if it were taken at points from $\rho(\tau)=0$ to $\rho(\tau)=1.0$, correlation curve (a) of FIGURE 3 would be modulated by the uncorrelated noise signal as indicated by curve (b) and the signal to noise ratio would correspond accordingly.

Figure 3:
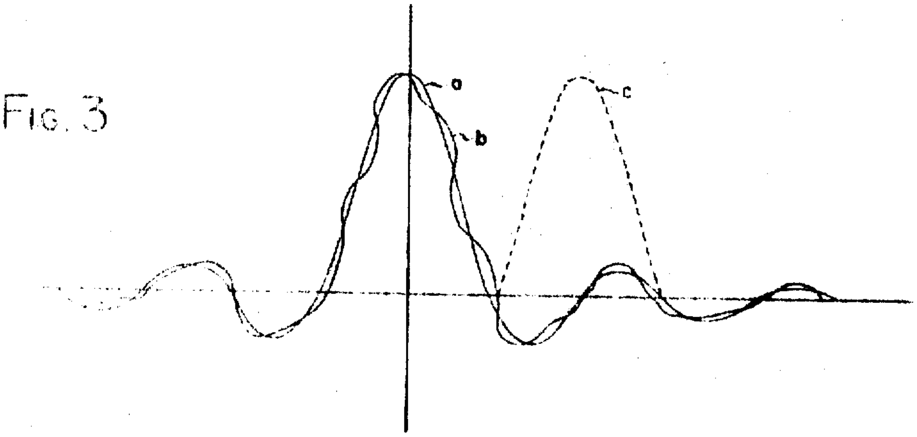
FIGURE 3 is a graph showing the plot of Equations 1 and 3.

In order to further demonstrate the discriminating characteristics of the correlation detector of the present invention the input-output signal to noise relationship of Equation 3 for noise and signals having uniform power spectrum and the reference signal and echo signal being matched, that is when $\rho(\tau)$ of FIGURE 3 is equal to 1.0, may be mathmatically defined as:

$$\left(\frac{P_e}{P_n}\right)_{out}=2TW\left(\frac{P_e}{P_n}\right)_{in} \qquad (4)$$

where $(P_e/P_n)_{out}$ and $(P_e/P_n)_{in}$ are respectively the output and input signal to noise power ratios and T and W are as previously defined.

$(P_e/P_n)_{in}$ may be further defined as the ratio $$\frac{1}{T}\int_0^T V_e^2dt\Big/\frac{1}{T}\int_0^T V_n^2dt \qquad (5)$$

where $V_e$ (the echo voltage) is much less than $V_n$ (the noise voltage) and it has been found that this ratio is generally of the magnitude of approximately .01. Assuming a selected signal duration T of approximately one second and a bandwidth W of approximately 10 kc. then $(P_e/P_n)_{out}$ would be approximately 200 and consequently the noise factor is very small.

Referring now to FIGURE 3 is shown the plot of Equations 1 and 3 with increasing values of $\tau$. Equation 3 is shown as curve (a) and Equation 1 is shown as curve (b). It can be seen that the modulation caused by the noise is relatively small and may be effectively ignored.

As previously explanied $\tau$ represents the relative time-shift between the two functions correlated and as to curve "a" these two functions (the reference signal and the echo signal) have the same wave form. Cross-over points (where $\rho(\tau)=0$) successively occur at time periods of $\tau=1/2W$. Resolution between successive echo waves is highly satisfactory provided the period of time therebetween is at least equal to $1/W$ as indicated by a second correlation function, curve c, of an echo wave arriving at a slightly later time. If the time between echo waves is less than $1/W$ (where curve $c$ would be displaced to the left) it can be seen that resolution would deteriorate since the successive correlation functions for the two echo waves would overlap which would result in indistinct images. Since resolution is effective at $1/W$, target recognition at increments of .5 foot is obtained if the bandwidth is 10 kc. and the speed of sound in water is approximately 5,000 feet per second.

It should be noted that a particular bandwidth may be obtained by recording a random noise wihch has a uniform power spectrum and which has a given bandwidth. Different bandwidths from that selected may be obtained by varying the intervals of time over which the selected noise form is reproduced by changing the correlator drum speed. For example, if the recorded random wave has a frequency range of from 1 kc. to 11 kc. over a given period of time T and the drum speed is doubled so the time period is $T/2$, then the frequency range is from 2 kc. to 22 kc. Therefore the bandwidth has increased from 10 kc., in the first instance, to 20 kc. when the drum speed is doubled. With increased bandwidth there is also increased resolution.

If the time period T is equal to one second this means that minimum range of detection without interference from the transmitted signal range will be about 2,500 feet whereas if the drum speed were increased the minimum range would decrease. At higher drum speeds the bandwidth increases but the water absorbs the higher frequencies resulting in a decrease in the signal to noise ratio. However, increased drum speed and bandwidth are not employed unless the range is small and with a small range, transmission time decreases with resulting smaller high frequency loss and therefore the signal to noise ratio is generally adequate even at distances of about 250 feet.

In view of the foregoing it can be seen that the present invention, the structural arrangement of which is hereinafter described, is capable of high range resolution, with minimum noise interference and is therefore capable of target recognition.

Figure 4A:
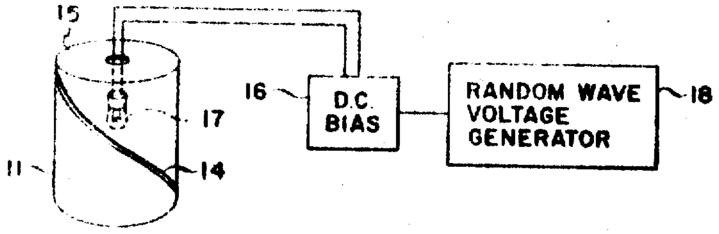
FIGURE 4A is a diagrammatic illustration of the recording light drum and random wave voltage generator.
Figure 4B:
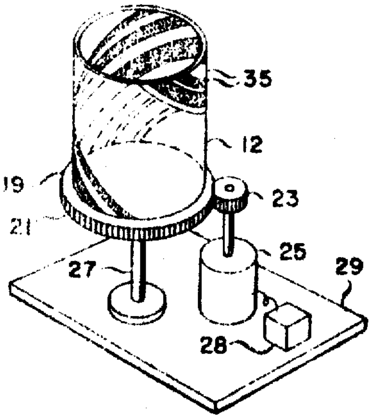
FIGURE 4B is a diagrammatic illustration of the storage cylinder and support and drive mechanism.
Figure 4C:
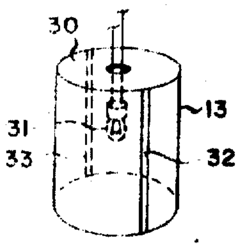
FIGURE 4C is a diagrammatic illustration of the operating light drum.

Referring now to the device which performs the above described mathematical operation, in FIGURES 4A, 4B and 4C are respectively shown recording light drum 11, storage cylinder 12 and operating light drum 13. Recording light drum 11 has a narrow helical slot 14 which wraps half-way around and from the top to the bottom of the drum such that when projected on a plane surface it would define a straight line. The bottom end of the drum is completely enclosed and the top of the drum is enclosed by plate 15 having a small opening therein to permit lead lines to be passed therethrough for interconnection of light source 17 and voltage generator 18. The output of voltage generator 18 has a random wave form and a uniform power spectrum as previously described. This output is applied to the input of D.C. bias 16 the output of which modulates light source 17 such that the intensity thereof varies directly with the random wave. A D.C. bias is necessary so the random wave is always positive thereby preventing reverse current from driving the light through zero intensity.

In FIGURE 4B is shown storage cylinder 12 which, prior to exposure, consists of a thin cylindrical film that has deposited on the surface thereof a photo sensitive coating. In order to provide rigid support of this thin film storage cylinder, a cylinder (not shown) made of glass, or similar material having high light transmission ability may be provided adjacent either the exterior or interior surface of the film. Storage cylinder 12 and the associated support cylinder are supported by means of circular base plate 19 having a slot near the outer periphery thereof for receiving the circular ends thereof. Gear teeth 21 are provided about the entire peripheral edge of base plate 19 for cooperation with the gear teeth of gear 23 which is driven by means of electric motor 25. Base plate 19 is rotatably mounted in a vertical position by means of support members 27. Speed control device 28 is operatively connected to motor 25 to control the speed thereof so the turning rate of storage cylinder 12 may be varied as desired. Electric motor 25, support members 27 and motor speed control 28 may be mounted on platform 29 as illustrated.

In FIGURE 4C is shown light drum 13 which is closed at the bottom end and the top is enclosed by plate 30 having a small opening therein for receipt of the lead lines connected to light source 31. In addition, light drum 13 is provided with oppositely disposed longitudinally extending slots 32 and 33 which permit the passage of light therethrough and the function of which will be hereinafter described.

It is to be understood that the particular configurations of the drums and storage cylinder and the support and drive means are only by way of illustration and substantial departure therefrom could be made and remain within the scope of this invention. In addition, light source 17 is shown only by way of illustration and may be supported in many different ways and rather than being spherical may be longitudinally extended to provide more uniform light distribution throughout the cylinder.

Referring to FIGURES 4A and 4B, the following procedure may be employed for exposing the light sensitive surface of storage cylinder 12. The recording light drum 11 is inserted into a thin wall cylinder hereinafter referred to as the master cylinder (not shown) which may consist of a thin film wrapped in a cylindrical manner or the thin film may be attached to a clear cylinder. The master cylinder is of such dimensions that the recording light drum is only slightly spaced from and concentric with the master cylinder. Recording light drum 11 is rigidly held in this position as by means of support members (not shown) connected to plate 15 and to support 29. Motor 25 is then turned on, the speed of which is controlled by device 28, which causes base plate 19 and the master cylinder to rotate therewith. It has been found that a master cylinder speed of approximately one-half revolution per second is satisfactory for operation of the device. After rotation is initiated, or simultaneously therewith, voltage generator 18 is turned on which causes modulation of the light of light source 17 about a constant level. Since the master cylinder is rotating with respect to helical slot 14, the modulated light will expose contiguous thin strips of film at levels which correspond with the modulated light. In this manner spiral strips of varying width and exposure will be formed on the master cylinder and represent the random signal output of voltage generator 18. The random wave form of voltage generator 18 is selected to have a duration of approximately one second, at the end of which time the light is turned off. This being the case, a plurality of spiral strips are formed half-way around the master cylinder and the remaining half of the master cylinder is not exposed rendering this surface clear when developed. After this procedure is completed, recording light drum 11 is removed and the master cylinder is then developed. The developed master cylinder is positioned in close contact and concentric with a second cylinder having a photosensitive coating and referred to as storage cylinder 12. Storage cylinder 12 is exposed to a constant light source through the master cylinder. When developed, storage cylinder 12 consists of a positive record of the original light intensity fluctuations produced by the random signal generator and form a plurality of spiral strips 35 as depicted in FIGURE 4B. The two step process is normally required in order to obtain a linear relationship between the light intensity fluctuations and the transmission of the storage cylinder. Mathematically, the transmission of the storage cylinder is expressed by $$T_s = E_s^{-\gamma_s}$$

where $T_s$ is the transmission of the storage cylinder, $E_s$ is the exposure of the storage cylinder and $\gamma_s$ is the slope of the well known Hurter and Driffield curve of the photosensitive coating on the storage cylinder surface. Since the storage cylinder is exposed through the master cylinder the exposure $E_s$ is proportioned to the light intensity transmitted by the master cylinder. Thus the exposure is expressed by $$E_s = KI_o E_m^{-\gamma_m}$$

where K is a constant, $I_o$ is the intensity of the light incident on the master cylinder, $E_m$ is the original exposure of the master cylinder and $\gamma_m$ is the $\gamma$ of the photosensitive coating on the master cylinder. Using this value for $E_s$ in the above equation results in the relationship $$T_s = [KI_o E_m^{-\gamma_m}]^{-\gamma_s} = CE_m^{\gamma_m \gamma_s}$$
$$= CE_m \text{ for } \gamma_m \gamma_s = 1$$

where C is a constant.

Thus a linear relationship between the transmission of the storage cylinder and the exposure of the master cylinder results provided the product $\gamma_m \gamma_s = 1$. Consequently, light intensity variations can be linearly recorded on the storage cylinder surface as transmission variations.

The light transmitted by the storage cylinder is proportional to the incident light intensity and to the transmission of the storage cylinder.

$$I_o = CE_m I_{in}$$

where $I_o$ is the transmitted light and $I_{in}$ is the incident light. In the operation of the device $E_m$ and $I_{in}$ are functions of time, $E_m(t)$ being the stored reference signal, and $I_{in}(t)$ the received echo signal plus noise thus the transmitted light $I_o(t)$ represents the product of the above two functions of time. It is this light that is integrated by placing film strips opposite slots 32 and 33.

The developed storage cylinder contains two broad helical bands one of which is opaque while the other broad band contains narrow helical strips of varying transmission.

An alternate way of exposing the storage cylinder in a one step process is as follows. The random noise signal is passed through a non linear amplifier having the following characteristic $$Y(t) = \frac{1}{S(t)}$$

where $y(t)$ is the output and $S(t)$ is the input. The output of the amplifier is used to vary the light intensity which exposes the storage cylinder while it is being rotated. The developed storage cylinder will have a transmission expressed by $$T_s = E_s^{-\gamma_s} = [KS(t)^{-1}]^{-\gamma_s} = CS(t)^{\gamma_s}$$

If the $\gamma$ of the storage cylinder photosensitive coating is chosen to be unity then the transmission of the storage cylinder is linearly related to the random signal $S(t)$.

After development, the storage cylinder is repositioned on base plate 19. It can be seen that if a light source having a constant intensity is placed within storage cylinder 12 and a fixed point of observation is located outside the cylinder, that upon rotation of the cylinder the light received by the observation point will vary with the random wave voltage which was generated by voltage generator 18. By converting the light received at this point source into electrical energy, as by means of a photocell, the electrical output will have the same shape as the random voltage created by voltage generator 18.

Figure 5:
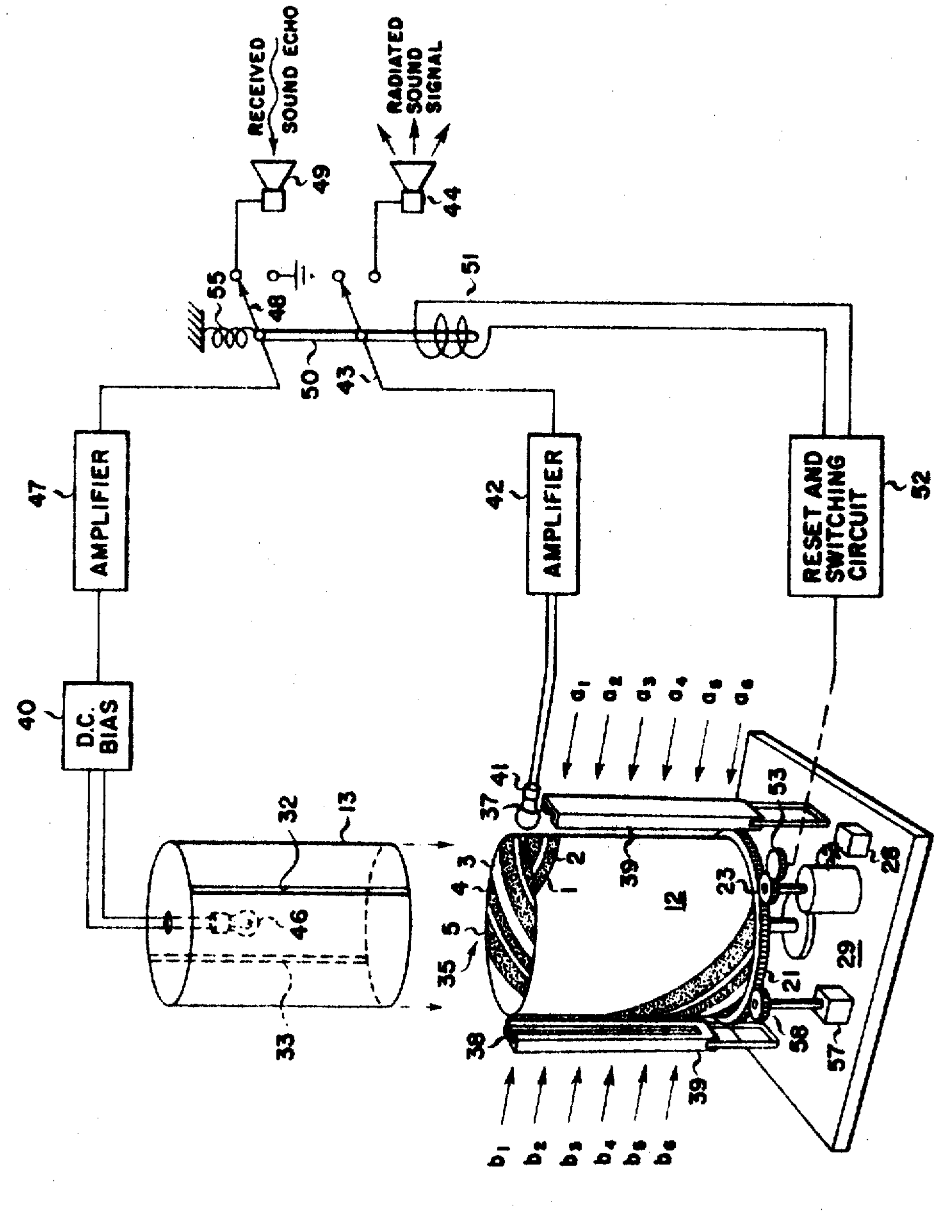
FIGURE 5 is a diagrammatic illustration of one embodiment of the over-all system of the present invention.

In FIGURE 5 is shown the over-all system which performs the mathematical and functional operations previously explained. In order that the operation may be more clearly illustrated, light drum 13 is positioned directly above storage cylinder 12 with the broken arrows indicating the light drum is concentrically disposed within the storage cylinder and that slot 32 is to the right and slot 33 is to the left as viewed in FIGURE 5. Film strips 37 and 38 are respectively mounted adjacent to and coextensive with slots 32 and 33. Each of these film strips are mounted in U-shaped brackets 39 which are vertically mounted on support 29 and on opposite sides of storage cylinder 12. Photocell 41 is mounted immediately above the mounting bracket for film strip 37 so as to receive light from only the uppermost portion of spiral strips 35. The output of photocell 41 is connected in series with amplifier 42, switch 43 and transducer 44. Light source 46 is connected in series with amplifier 47, D.C. bias 40, switch 48 and hydrophone 49. Switches 43 and 48 are connected to rigid member 50, one end of which is the core of solenoid 51. Switches 43 and 48 are connected such that switch 43 is open when switch 48 is closed and switch 48 is open when switch 43 is closed. When switch 48 is closed, it is electrically connected to the hydrophone and when it is open, it is electrically connected to ground so that bias supply applies a constant D.C. voltage to light source 46 which therefore provides a constant intensity light output. A conventional reset and switching circuit 52 is operated in response to rotation of storage cylinder 12 through gears 21, 23 and 53. The output of the reset and switching circuit is connected to solenoid 51 and member 50 is normally biased in the position shown, by means of spring 55, and when current is applied to solenoid 51, member 50 is retracted causing switch 43 to close and switch 48 to open. The gear linkage of the switching circuit is selected so from zero to one-half revolution of storage cylinder 12 the switching circuit is closed and after one-half revolution it is opened and remains open until actuation of the reset. Therefore from zero to one-half revolution, current through solenoid 51 causes switch 43 to close and switch 48 to open. At the end of one-half revolution, the current is removed and spring 55 biases switch 43 open and switch 48 closed as illustrated. In this manner the output of photocell 41 is connected to transducer 44 for only one complete time period of the random wave which is stored on storage cylinder 12 and thereafter amplifier 47 is connected to hydrophone 49 for receipt of the echo of the transmitted random wave. Normally the reset will not be actuated until after an echo or a series of echoes have been received by the hydrophone or until such time that it is known no echoes will be received due to the great distance of the target. The reset may be manual, as above described, or automatic. When automatic, it may be responsive to a predetermined time after switch 43 is opened or it may be responsive to the random signal or signals received by hydrophone 49. Revolution counter 57 is operatively connected to gear 21 by means of gear 58 to provide an indication of the number of revolutions of storage cylinder 12.

In order to more clearly illustrate the operation of the device set forth in FIGURE 5, reference is directed to FIGURES 6A through 6E. In FIGURE 5 the light and dark bands representing the recorded signal are identified by the numbers 1 through 5. (In practice there would be about a thousand such bands.) Characters $a_1$ through $a_8$ and $b_1$ through $b_8$ represent equally spaced observation points from top to bottom of slots 33 and 32, respectively. In practice there is continuous range of observation points extending longitudinally along each of the slots. The position of photocell 41 is coincident with observation point $a_1$.

Figure 6A:
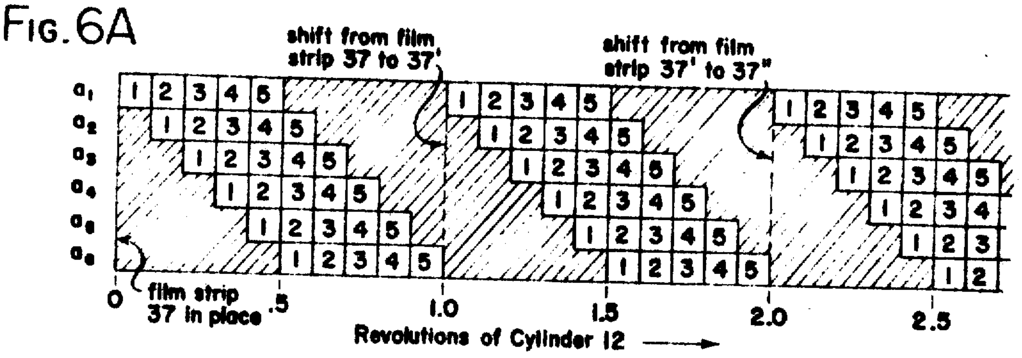
FIGURES 6A through 6E are plots illustrating the transmission, correlation and integration methods of the present invention.

In FIGURES 6A through 6E are illustrated the transmission, correlation and integration methods of the present invention. In FIGURE 6A is illustrated the signal at slot 32 as represented only by the recorded signal on storage cylinder 12. The ordinate of this figure represents observation points $a_1$ through $a_8$, the abscissa represents revolutions of cylinder 12 and the random niose signal is represented by numbers 1 through 5. Zero time or revolution of cylinder 12 is taken at observation point $a_1$ at the initial point of the random wave stored on storage cylinder 12. (At zero time, the storage cylinder of FIGURE 5 would be rotated one-fourth revolution counter clockwise.) As the cylinder rotates from this zero reference point through one-half revolution the entire random wave will be seen at observation point $a_1$ as denoted by numbers 1, 2, 3, 4, 5. From one-half to one revolution no signal will be observed at observation point $a_1$ since the storage cylinder as viewed during this period of time is opaque. From one to one and one-half revolutions the random wave signal is repeated at observation point $a_1$. This sequential repetition is repeated as long as cylinder 12 is rotated. It can be seen that the random signal at observation point $a_2$ is delayed in time or in revolution since the observation points are taken in a vertical line and the random wave stored on cylinder 12 wraps at an angle to the vertical. The random wave at observation point $a_2$ is repeated in the same manner as that at observation point $a_1$. In FIGURE 6A it can be seen that observation point $a_3$ receives a signal at a later period of time than $a_2$ and observation points $a_4$, $a_5$ and $a_6$ are respectively delayed with respect to each other.

The illustrated step delays are for purpose of explanation and in actuality these are an infinite number of signal delays since the recorded signal is at an angle with respect to the observation points. It is not possible to illustrate the infinite number of delays in FIGURE 6A (as well as the hereinafter-described FIGURES 6B and 6D) since it would require an infinite number of observation points ($a_1$ through $a_x$ in place of $a_1$ through $a_6$) and an infinite number of delayed random wave signals (each of which would be denoted by numbers 1, 2, 3, 4 and 5. If this were done, the right and left edges of the random wave signals would be sloping straight lines rather than having the step shape shown in FIGURES 6A, 6B and 6D.

Figure 6B:
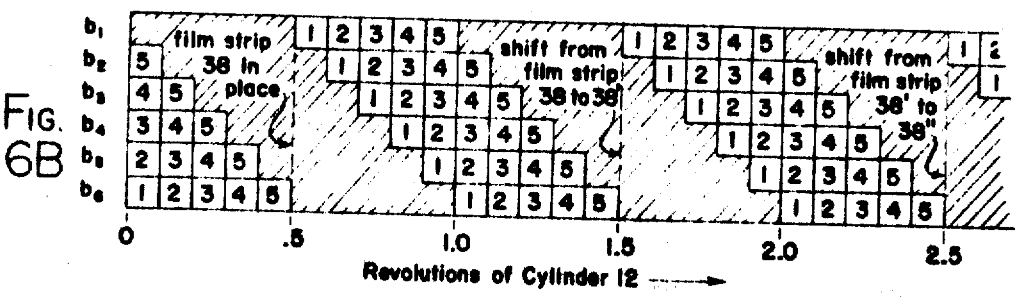

Referring now to FIGURES 6B is shown the signal at slot 33 as represented only by the recorded signal on storage cylinder 12. Since slots 32 and 33 are placed directly opposite from each other and since film strips 37 and 38 are longitudinally aligned with these slots, there is 180° or one-half revolution delay in the signal seen at slot 33 with respect to that seen at slot 32. This is illustrated in FIGURE 6B by showing the signal observed at observation point $b_1$, being one-half revolution later in time with respect to the signal observed at observation point $a_1$ of FIGURE 6A. The same is likewise applicable to observation point $b_2$ with respect to observation point $a_2$ as well as the remaining observation points. The same delay between observation points $b_1$ through $b_6$ exists as previously described with relation to observation points $a_1$ through $a_6$. It is of particular importance to note that at any instant throughout the complete revolution of cylinder 12 there is always an observation point which sees the initial starting point of the random wave signal which is stored on storage cylinder 12. This is particularly important since it is necessary to correlate this recorded signal with the echo signal at any time during the revolution of the stored cylinder.

Figures 6C, 6D:
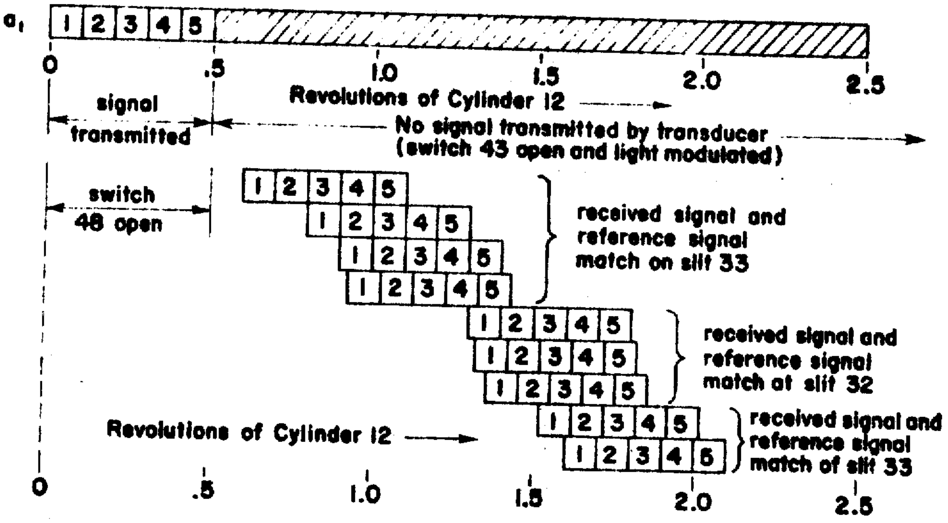

In practice photocell 41 is placed at observation point $a_1$. As previously explained, from zero to one-half revolution, switch 43 is closed and switch 48 is open. However, when switch 48 is open it is connected to ground so that light 46 is radiating at a constant intensity level. This being the case, the light received by photocell 41 will vary in accordance with the signal stored on storage cylinder 12 through the first one-half revolution. The photocell converts the light energy into a corresponding electrical energy which is amplified and transmitted by means of transducer 44 since switch 43 is closed from zero to one-half revolution. At the end of one-half revolution switch 43 is opened and switch 48 is closed so that the photocell is no longer electrically connected to the transducer and the hydrophone is now electrically connected to the light source 46 in light drum 13. In FIGURE 6C is shown the random wave signal recorded on storage cylinder 12 and being transmitted by transducer 44 from zero to one-half revolutions. After one-half revolution there is no transmission as indicated by the shaded lines. On the basis of probability it is unlikely that the echo signal would correlate with the recorded signal at point $a_1$ and it would therefore be unnecessary to open switch 43 after one-half revolution. However, to eliminate this possibility and to also prevent the transmission of any noise from the transducer, switch 43 is opened after one-half revolution.

In FIGURE 6D are shown the echo signals received by hydrophone 49 and for practical purposes instantaneously modulated on light 46. If any targets were sufficiently close to the transducer such that the echo signal is received by the hydrophone prior to one-half revolution of the storage signal, this target would not be detected since switch 48 is open during this period of time. This switch position is obviously necessary since if otherwise, the output of the transducer would be received by the hydrophone and, in addition, a constant signal would not be available at light 46 during the first one-half revolution. To decrease the range in order that a target of this nature might be observed it would be merely necessary to increase the rotation rate of storage cylinder 12 by means of speed control 28. For purposes of illustration the first echo signal is shown to be received by the hydrophone at .6 revolution of cylinder 12. From FIGURE 6B it can be seen that point $b_2$ is adjacent the initial point of the random signal recorded on the storage drum. Therefore, the echo signal will match or be correlated with the recorded signal at $b_2$ and permits maximum light transmission through the storage cylinder and to film strip 38. As previously explained and as best depicted in FIGURE 3, the attenuation of the echo signal is very rapid with respect to the phase shift from the recorded signal. Therefore the maximum amount of light is transmitted to the film strip at point $b_2$ (film strip 38 of FIGURE 6E) while at other points only the constant bias value of the light is transmitted to the film strip. The point at which correlation occurs will appear on the developed film strip as a bright point with respect to the grey level produced by the bias. This operation may be defined as the correlation of the echo with the recorded signal. It is to be particularly noted that integration of the echo signal will result because the light sensitive film coating employed has an exposure that increases directly with time of exposure as well as with the intensity of exposure. This being the case, integration of the echo signal results.

To compare this operation with the operations set forth in FIGURE 2, the correlation of the echo modulated light source intensity with the recorded signal results in the product of the recorded signal and the echo signal which is illustrated in curve D of FIGURE 2 and the integration of the product of these two signals results from the characteristics of the film as previously explained which corresponds with curve F of FIGURE 2. The noise that is received by hydrophone 49 and modulated on the light source about a bias value as indicated by curve E of FIGURE 2 is transmitted through the storage cylinder and adds and subtracts from the bias value an equal amount wherein the integrated light appears on the film as a small variation about the constant grey level produced by the bias light and is not confused with a point source.

Figure 6E:
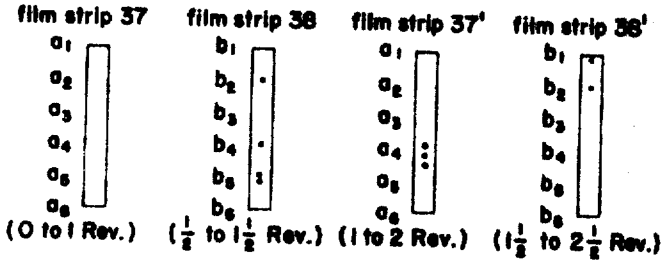

Additional echo signals received from .6 to 1 revolution are illustrated in FIGURE 6D as indicated and appear on film strip 38 as shown in FIGURE 6E. The echo signals received from 1 to 1.5 revolutions as illustrated in FIGURE 6D appear as points on film strip 37′ and the echo signals received from 1.5 to 2.0 revolutions as illustrated in FIGURE 6D appear as points on film strip 38′. It should be particularly noted that the above reference to echo signals refers to the leading edge of the echo signal and there will be overlap of these echo signals since each echo signal has a duration of one-half revolution of the storage cylinder.

FIGURE 6E shows the developed film strips which were exposed during the revolution interval indicated. It is to be noted that the film strips can be replaced, that is, a continuous film strip can be shifted or indexed without interfering with the integration process provided this shifting occurs rapidly at the revolution points indicated in FIG- URES 6A and 6B. The use of two slots and the opaque band on the storage cylinder makes this possible. If only one slot were used and the total storage cylinder surface was completely covered with recording then the film strip could not be shifted without interrupting the integration process at all points other than the particular echo reference point in question. It can be seen that by employing two slots integration takes place for the entire duration of each echo signal irrespective of the time of arrival. To illustrate, assume film strip 37 were shifted to film strip 37' at 0.9 revolution, then, a signal arriving at 0.5 revolution would be integrated over only 80% of the duration of the echo signal. It can therefore been seen that it is desirable to shift the films as nearly as possible at the times indicated; however, a small time increment is tolerable since 80% integration, for example, will provide a sufficiently intense spot in the film to distinguish from the grey bias level or other target spots. It is necessary to provide the broad opaque strip rather than a repeated reference signal since an echo signal would otherwise appear as a bright spot on both film strips simultaneously. The two film strips 37 and 38 are alternately shifted at one revolution intervals until it is decided that no additional echo signals will be received. For illustrative purposes only, the films are shown as individual strips; however, it is to be understood that these strips could be machine fed from a continuous roll or that wide film strips could be moved laterally with respect to the slots 32 and 33 after each exposure duration period. At the termination of the reception time of the hydrophone the various strips could be removed and spliced and assembled to facilitate reading.

In view of the foregoing, it will be apparent that there are an infinite number of delays which are practiced by utilization of the present invention and these delays are brought about by comparing the modulated light signal to the sloping reference bands. This will be evident from the fact that the edge of each band has an infinite number of elevations above a zero reference point. In addition, even though the correlation point is of finite size, the center of this point may have an infinite number of positions throughout the film strip length. This is predicated upon the fact that the permanently recorded reference signal has an infinite number of time delays over the time period of the recorded reference signal. In addition, the modulated light signal is multiplied by the reference signal at each delay point continuously over the time duration of the reference signal. These products are then integrated as a function of time at each delay point by imaging the light transmitted at each delay point onto the film strip or other integrating device.

In order to illustrate the effectiveness of target recognition by this method, it is assumed that the speed of sound in salt water is approximately 5,000 feet per second. If the film strip and storage cylinder were approximately 10 inches in length, target recognition at 50 foot intervals would be represented by point images spaced one-fifth of an inch apart along the film strip. Target recognition or resolution at .5 foot intervals (which, as explained previously, is the resolution capability of the correlation function when $W=10$ kc.) would be represented by point images spaced .002 inch apart. Since the resolution capabilities of ordinary film is 1750–2500 lines per inch the bright spots can be readily resolved by magnification or projection.

Figure 7:
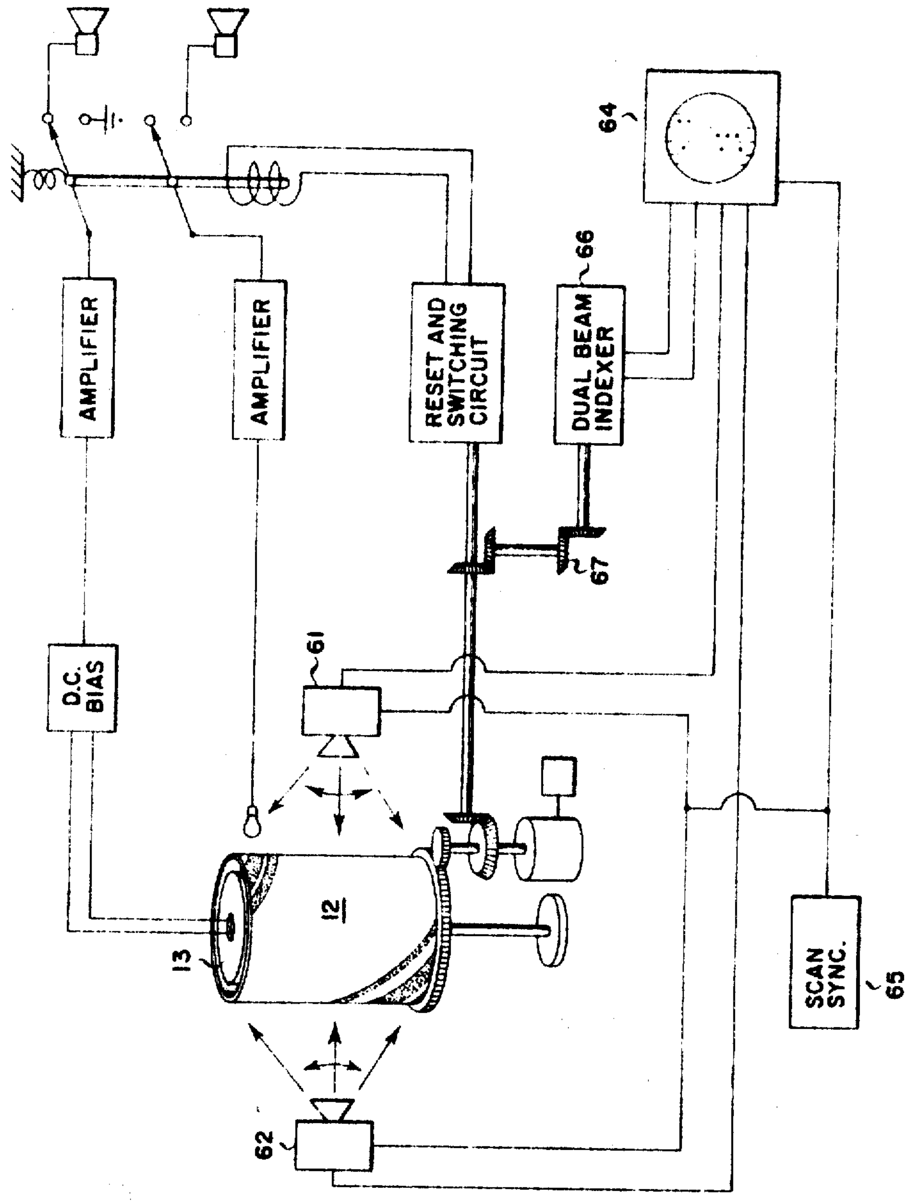
FIGURE 7 is a diagrammatic illustration of a modification of the embodiment shown in FIGURE 5.

In FIGURE 7 is illustrated another embodiment in which the output of the correlator is presented. In this embodiment integration is not obtained by film strips, but rather, it is obtained by scanning each slot of the light drum by photocell scanners and displaying the photocell output on a dual beam cathode ray tube. In FIGURE 7 light drum 13 is disposed within storage cylinder 12 in the same manner as in the embodiment of FIGURE 5 and, in addition, similar motor drive, counting, speed control, reset and switching devices are employed. Scanning photocells 61 and 62 are mounted so they will scan the longitudinally extended slots of light drum 13. This scanning process may be performed by rapidly oscillating the photocells, rigidly mounting the photocells and employing rotating prisms or rocking mirrors that scan, collect and focus the light on the rigidly mounted photocells or by using television camera tubes such as the image orthicon or the vidicon. It is to be understood that many other methods of scanning could be employed and those described are considered to be only exemplary. To provide adequate integration time the scan rate is selected to be sufficiently rapid so the rotating cylinder appears nearly stationary for several scans. The output of each photocell is applied to separate accelerating electrodes of dual beam cathode ray tube 64 and the scan rate and position of the photocells is synchronized with the vertical sweep rate and position of cathode ray tube 64 by means of a scan synchronous device generally denoted by reference numeral 65.

The function of dual beam indexer 66 is to shift the horizontal position of the vertical sweep of each beam of dual beam cathode ray tube 64 so as to correspond with the shifting of the film strips of the FIGURE 5 embodiment as best depicted in FIGURES 6A and 6B. This may be accomplished by employing a pair of stepping switches which may be driven through gear train 67 by the rotating mechanism of the storage cylinder and each position of the stepping switches provides a different output voltage applied to the horizontal plates of dual beam cathode ray tube 64. Referring to FIGURE 6A, one stepping switch will provide a potential $e_1$ corresponding with the position where film strip 37 is in place and a potential $e_3$ corresponding with the shift from 37 to 37'. Referring to FIGURE 6B, the other stepping switch will provide a potential $e_2$ corresponding with the position where film strip 38 is in place and a potential $e_4$ corresponding with the shift from 38 to 38'. The potentials $e_1$, $e_2$, and $e_4$ are selected to be progressively increasing so as to shift the new vertical sweep an amount sufficient to distinguish it from the immediately preceding vertical sweep. In this manner the vertical sweep of each channel is shifted each full revolution of storage cylinder 12 and the channel shifts are staggered at one-half revolution intervals. The phosphor face of the cathode ray tube is selected to have a long time constant for performing the integration process and to provide a long memory.

Since there is correlation between the echo and the recorded signal at only one point on the slot, the photocell of the scanning device receives this signal (at one point during each scan and for the duration of the echo signal) and since the photocell scanning rate is synchronized with the dual beam cathode ray tube vertical sweep rate, the echo will appear as a spot on the phosphor surface at a vertical position proportional to the vertical position at which the echo appears on the drum slot. The scan is repeated for the duration of the echo signal and the phosphor surface integrates the correlated signal resulting in a bright spot on the screen of the cathode ray tube.

The previous analysis as to the correlation operation, with particular reference to FIGURES 6A–6E, is applicable to this embodiment and the position of the targets shown on the screen of cathode ray tube 64 corresponds with the position of the targets illustrated in FIGURES 6D and 6E.

Figure 8:
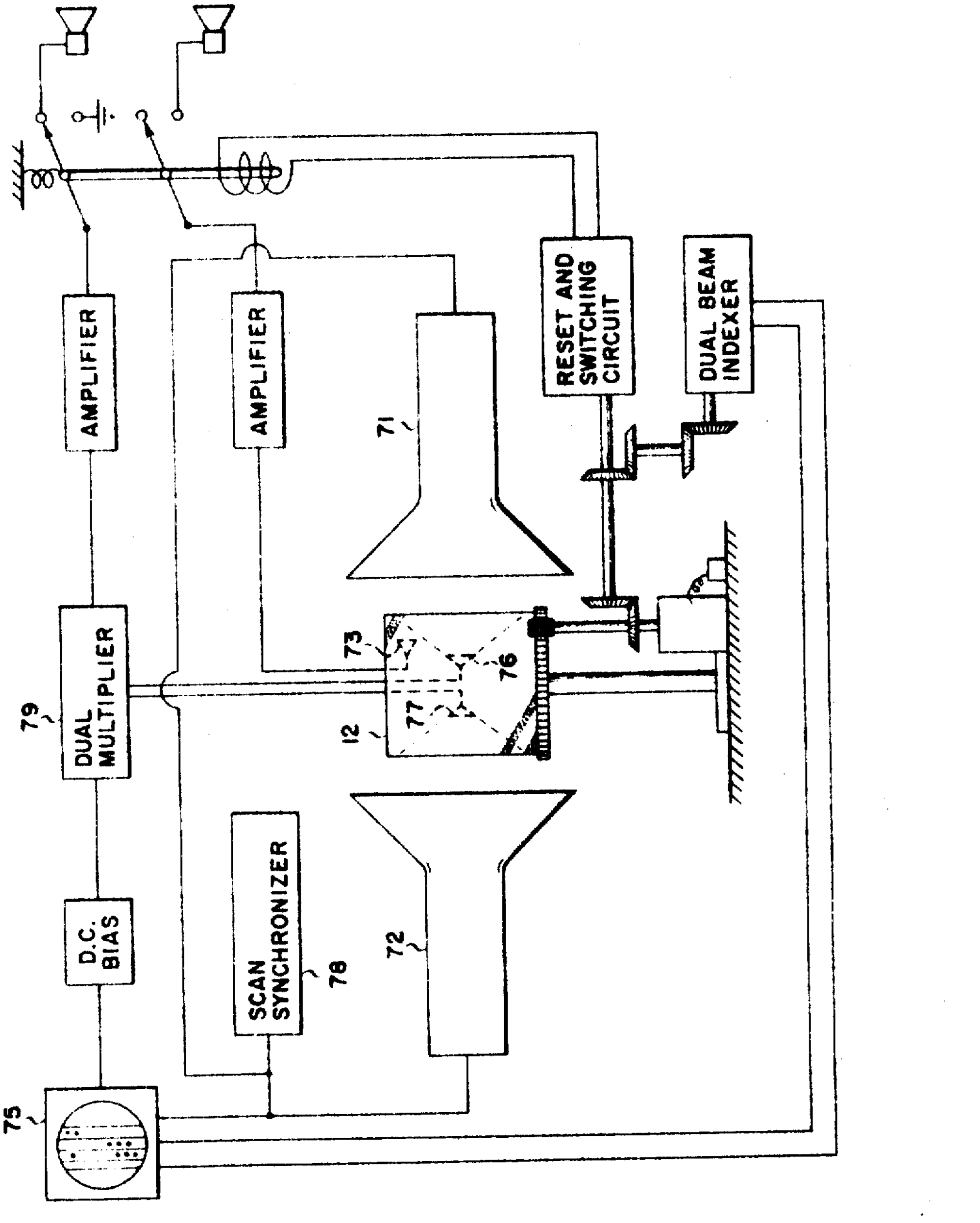
FIGURE 8 is a diagrammatic illustration of another modification of the embodiment shown in FIGURE 5.

In FIGURE 8 is schematically illustrated another embodiment in which the output of the correlator is presented. The slots of light drum 13 are placed in close contact with the faces of cathode ray tubes 71 and 72. The electron beams of these cathode ray tubes rapidly scan in a line along the vertical axis of the tubes which are positioned opposite and aligned with the slots of light drum 13. Low persistence phosphor is used on the faces of these cathode ray tubes so the light from the tube face arrives only from the point where the electron beam strikes the tube face. The light transmitted from the instantaneous position of the spot depends upon the transmission of the storage cylinder surface at that position on the slot opposite the spot formed by the cathode ray tube electron beam. In order to transmit the random wave signal, the spot on the face of cathode ray tube 71 is positioned directly opposite photocell 73 during the half-revolution transmission period or in the alternative, a separate light source may be provided opposite photocell 73 during this period and then turned off during the listening or reception period. During the reception period, cathode ray tubes 71 and 72 are caused to scan at a rapid rate that is synchronized with dual beam cathode ray tube 75 by means of scan synchronizing device 78. The light transmitted through storage cylinder 12 from scanning cathode ray tubes 71 and 72 is converted to electrical signals by photocells 76 and 77 which are positioned inside drum 13 in such a manner as to collect all the light transmitted by their respective slots. Since the spot or beam intensity of cathode ray tubes 71 and 72 are constant, the electrical output signal of the photocells represents the stored reference signal as read along the correlator slot. Each of these signals are electronically multiplied by the received hydrophone signal in separate channels in dual multiplier 79, which may comprise a pair of conventional multiplier vacuum tubes. The product of these signals is then integrated on the face of cathode ray tube 75 in the same manner as described with relation to the FIGURE 7 embodiment.

Figure 9:
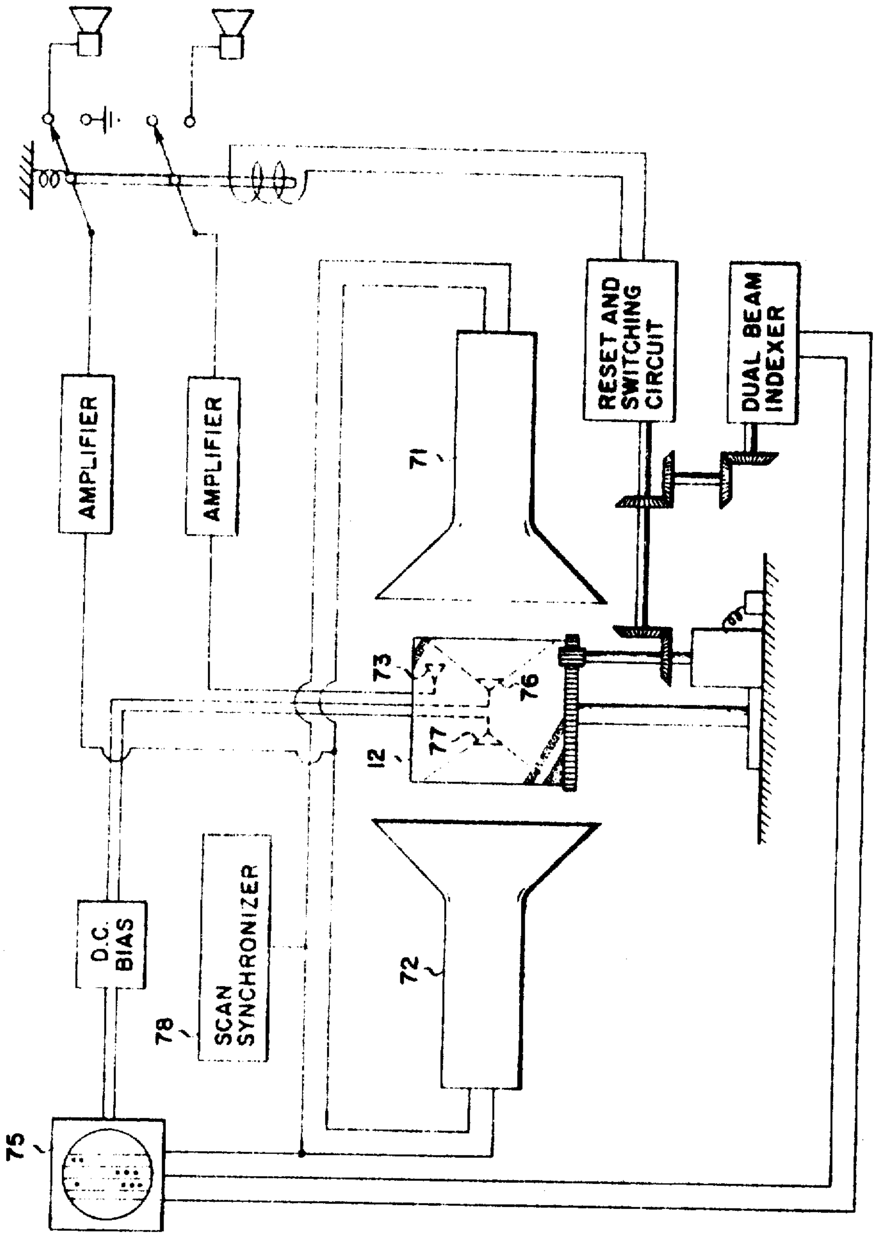
FIGURE 9 is a diagrammatic illustration of another modification of the embodiment shown in FIGURE 5.

In FIGURE 9 is shown another embodiment of the present invention. In this embodiment the received echo signal is used to intensity modulate the spots of scanning cathode ray tubes 71 and 72 rather than maintaining constant intensity spots as in the FIGURE 8 embodiment. The transmitted light reaching the photocells therefore represents the product of the echo and reference signal. The outputs of the photocells are then integrated and presented on dual beam cathode ray tube 75 in the same manner as described in the FIGURE 7 embodiment.

Figure 10:
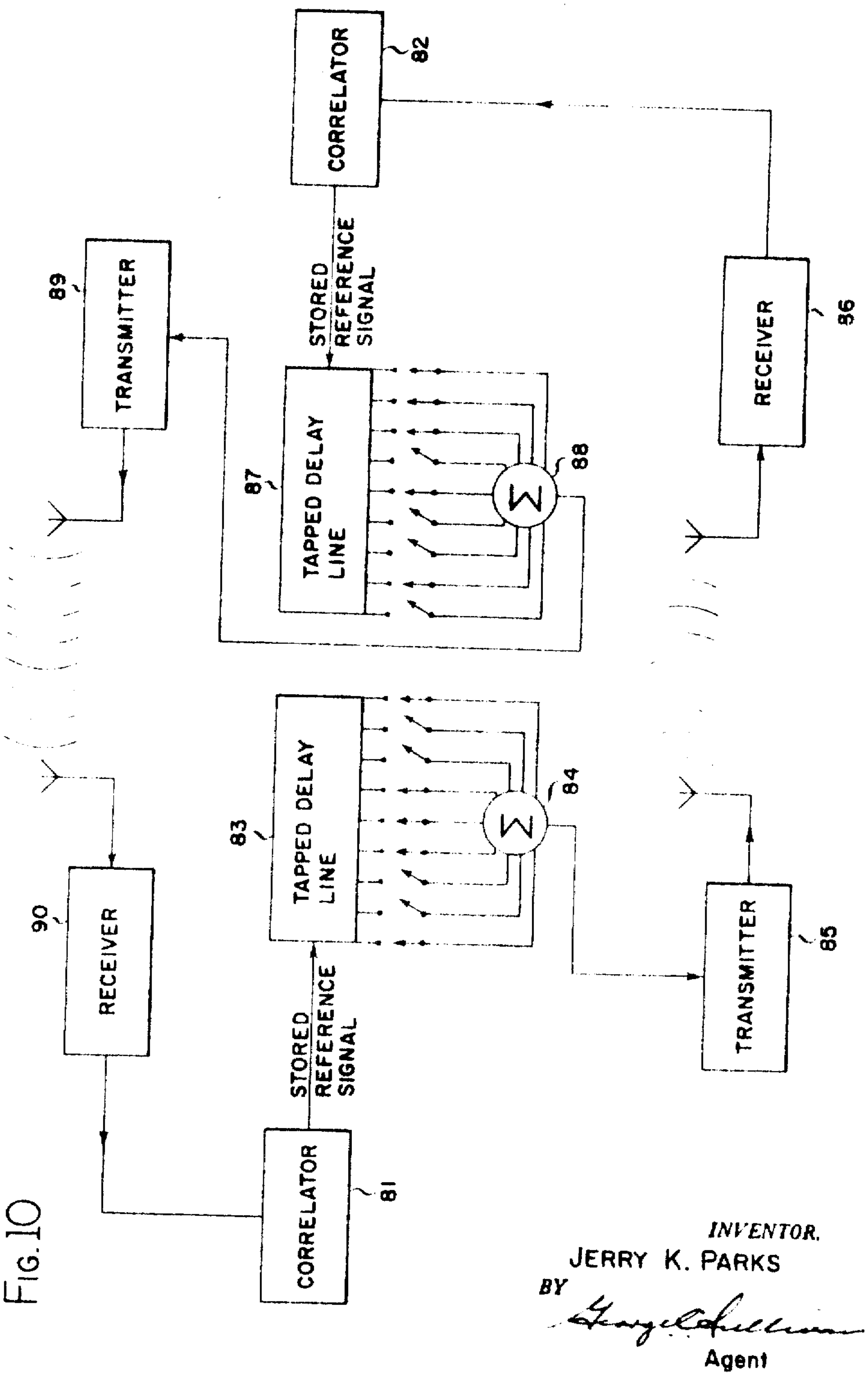
FIGURE 10 is a diagrammatic illustration of a communication system employing the embodiments of FIGURES 5, 7, 8 and 9.

Any two of the embodiments shown in FIGURES 5, 7, 8 and 9 which have identical stored signals (storage cylinder made from the same master) may be employed for communication with random noise by means of the device schematically illustrated in FIGURE 10. The correlator embodiments are generally denoted by reference numerals 81 and 82 in FIGURE 10. It is necessary that both storage cylinders of correlators 81 and 82 rotate at the same rate. The stored reference signal of the correlator is applied to the input of tapped delay line 83 so the signal may be delay modulated in a predetermined coded manner. This modulation may be performed by selecting a particular combination of tapping points by means of the associated switches to delay the signal in a predetermined manner. These delayed signals are summed in summing amplifier 84 and the summed signals are then transmitted as sonar or radio signals by means of transmitter 85. These transmitted signals are received by receiver 86 and applied to the input of correlator 82 and appear as a series of bright spots on the film or phosphor which have a spacing proportional to the spacing between tapped points in tapped delay line 83 as determined by the position of the closed switches associated therewith. This received information may then be decoded. Information may then be transmitted by coding the output of correlator 82 by positioning the switches of tapped delay line 87, summing these delayed signals in summing amplifier 88, transmitting these summed signals by transmitter 89, receiving these delayed signals by receiver 90 and decoding the information in correlator 81.

This system has the advantage of being a secure communication system since it is required that both sender and receiver have the same storage cylinder in order to communicate. Another advantage of this system is that an extremely large number of channels may be employed (a great number of random noises as well as drum speeds may be selected) which may even be superposed on existing frequencies without causing interference.

In the hereinbefore-described embodiments the recorded signal was wrapped around a transparent cylinder or was formed in a cylindrical shape and the recorded signal was then rotated at some predetermined rate. It will be understood that these same principles may be employed in a device wherein the recorded signal is in a flat plane such as illustrated in FIGURE 6A, as distinguished from being in the form of a cylindrical surface. In the situation where the recorded signal is in a flat plane, it is only necessary that there be relative lateral motion between the light source and the flat recorded signal. This could be achieved, for example, by either moving the flat recorded signal with respect to the light source or by having the light from the light source scan longitudinally along the flat recorded signal. Referring to FIGURE 6A, the vertical dotted line (referred to a "shift from film strip 37 to 37'") would represent the light beam which would scan from left to right or the recorded signal would be moved from right to left. The implementation of one embodiment which would function in the manner above described would be to have light from a light source pass through a light valve which causes the light to fan out to provide a vertical line of illumination across te flat recorded signal (as can be generally depicted by the dotted line in FIG. 6A). On the opposite side of the flat recorded signal is positioned a vidicon which would function as an integrating device. Modulation of the vertical line of light can be done by modulating the light source or by modulating the light valve while holding the light source constant. As previously stated, the vertical line of illumination may sweep a stationary flat recorded signal or the flat recorded signal could be moved in a direction perpendicular to the vertical line of illumination. In the former situation it would be necessary to have the light beam fall upon the surface of the integrating device throughout the whole period of the received signal. This could be achieved, for example, by moving the integrating device with the scan light beam. In the latter situation the flat recorded signal would be moved perpendicular to the vertical line of illumination. The recording of the reference signal could consist of several repeats of the same reference signal with a predetermined blank duration between each repeat or it could consist of a single recorded signal. It will generally be desirable to provide a technique for rerunning the reference signal after the time integration period has transpired.

It is to be understood in connection with this invention that the embodiments shown are only exemplary, and that various modifications can be made in construction and arrangement within the scope of the invention as defined in the appended claims.

What is claimed is:

1. A correlation device comprising a cylinder having a plurality of light transmitting helical bands representing the wave form of a random noise signal, means for rotating said cylinder, a light source for passing light through said cylinder, means responsive to the light passed through said cylinder for transmitting a signal corresponding to the random noise represented by said helical bands, means for receiving said signal, means modulating the light intensity from said light source with the received signal and means integrating the light transmitted through said cylinder from the modulated light intensity from said light source.

2. A correlation device comprising a cylinder having a plurality of light transmitting helical bands representing the wave form of a random noise signal, means for rotating said cylinder, a light source disposed within said cylinder for passing light through said cylinder, means disposed outside said cylinder and responsive to the light passed through said cylinder for transmitting a signal corresponding to the random noise represented by said helical bands, means for receiving said signal, means modulating the light intensity from said light source with the received signal and light sensitive film disposed adjacent the exterior surface of said cylinder for integrating the light transmitted through said cylinder from the modulated light intensity from said light source.

3. A correlation device comprising a cylinder having a broad opaque helical band covering half the cylindrical surface and the remainder of the cylindrical surface comprising a plurality of light transmitting helical bands representing the wave form of a random noise signal, an opaque drum having two oppositely disposed longitudinally extending slots disposed within said cylinder, means for rotating said cylinder, a light source disposed within said drum for passing light through said cylinder, means disposed outside said cylinder and adjacent said slot and responsive to the light passed through said cylinder for transmitting a signal corresponding to the random noise represented by said helical bands, means for receiving said signal, means modulating the light intensity from said light source with the received signal and light sensitive film strips disposed adjacent each of said slots for integrating the light transmitted through said cylinder from the modulated light intensity from said light source.

4. A correlation device comprising a cylinder having a broad opaque helical band covering half the cylindrical surface and the remainder of the cylindrical surface comprising a plurality of light transmitting helical bands representing the wave form of a random noise signal having a uniform power spectrum, an opaque drum having two oppositely disposed longitudinally extending slots disposed within said cylinder, means for rotating said cylinder, a light source disposed within said drum for passing light through said cylinder, means disposed outside said cylinder and adjacent said slot and responsive to the light passed through said cylinder for transmitting a signal corresponding to the random noise represented by the said helical bands, means for receiving said signal, means modulating the light intensity of said light source with the received signal, light sensitive scanning means disposed outside said cylinder for scanning each slot and means responsive to the output of said scanning devices for integrating their outputs.

5. The device of claim 4 wherein said integrating means comprises a dual beam cathode ray tube and means for synchronizing the scan rate of said scanning means and said last mentioned means.

6. A correlation device comprising a cylinder having a broad opaque helical band covering half the cylindrical surface and the remainder of the cylindrical surface comprising a plurality of light transmitting helical bands representing the wave form of a random noise signal having uniform power spectrum, an opaque drum having two oppositely disposed longitudinally extending slots disposed within said cylinder, means for rotating said cylinder, a pair of light sources positioned outside of said cylinder and adjacent said slots for scanning said slots, a pair of photoelectric cells disposed within said drum for receiving light transmitted through said slots from said light sources, another photoelectric cell positioned adjacent one of said slots, means connected to the output of said pair of photoelectric cells for integrating the output signals thereof, means operatively connected to said scanning devices for modulating the intensity thereof whereby the output of said another photoelectric cell is a signal corresponding to the random noise represented by said helical bands when the intensity of said scanning devices is constant and each of said scanning devices is modulated by this output signal providing a maximum product of the modulated scanning signal and the signal represented on said drum at only one particular point during the scan period.

7. A correlation device comprising a cylinder having a broad opaque helical band covering half the cylindrical surface and the remainder of the cylindrical surface comprising a plurality of light transmitting helical bands representing the wave form of a random noise signal having a uniform power spectrum, an opaque drum having two oppositely disposed longitudinally extending slots disposed in said cylinder, means for rotating said cylinder, a pair of light sources positioned outside of said cylinder and adjacent said slots for scanning said slots with a constant light intensity, a pair of photoelectric cells positioned within said drum for receiving the light transmitted through said slots from said light sourse, a photoelectric cell disposed within said drum for transmitting the signal represented by the helical bands on said cylindrical surface, means for receiving said signal transmitted by said photoelectrical cell, means for multiplying the signal received by said last mentioned means and the output of said pair of photoelectric cells and means for integrating the product of this multiplication.

8. A device of claim 7 having a scan synchronizing means for synchronizing the scan rate of said integrating means and said pair of light sources.

9. A device for transmitting and receiving information comprising a cylinder having a plurality of light transmitting helical bands representing the wave form of a random noise signal, a light source for passing light through said cylinder, means responsive to the light transmitted through said cylinder from said light source for converting the light signal into a time delayed modulated electrical signal having the same form as represented by said plurality of bands, means for transmitting the time delayed modulated signal, means for receiving a time delay modulated signal having the same form as represented by said plurality of bands, means for modulating said light source with the received signal and means for integrating the light transmitted through said cylinder from said modulated light source.

10. A device for transmitting and receiving information comprising a cylinder having a plurality of light transmitting helical bands representing the wave form of a random noise signal, a light source for passing light through said cylinder, means responsive to the light transmitted through said cylinder from said light source for converting the light signal to an electrical signal having the same form as represented by said plurality of bands, a tapped delay line operatively connected to the output of said last mentioned means for providing a plurality of said electrical signals which are delayed in time, means for summing said plurality of said electrical signals, means for transmitting the summed signals, means for receiving a time delay modulated signal having the same form as represented by said plurality of bands, means for modulating said light source with the received signal and means for integrating the light transmitted through said cylinder from the modulated light source.

11. A device for correlating a reference signal with a received signal having about the same wave form comprising means having permanently recorded sloping reference hand of predetermined light transmitting characteristics, means responsive to light transmitted through said first mentioned means for transmitting a signal, means for receiving the transmitted signal, a source of light modulated by the received signal from said last mentioned means, the modulated light being transmitted through said first mentioned means, means for integrating as a function of time the modulated light being transmitted through said first means.

12. A correlation device comprising means permanently recording a reference signal having a time period and a complete range of time delays over said time period, in the form of sloping reference bands, means producing a transmitted signal having about the same characteristics as said reference signal and extending over about the same time period, means for multiplying said reference signal by said transmitted signal at each point of time delay, said multiplication continuing at each said point of time delay, over a finite period of time, means for integrating as a function of time the product of the multiplication at each point of time delay.

13. A correlation device comprising light transmitting means having permanently recorded predetermined light transmitting characteristics, which defines a wave form of a random noise signal, a light source for passing light through said light transmitting means, means responsive to the light passed through said light transmitting means from said light source for transmitting a signal having about the same characteristics as said light transmitting means, means for obtaining the product of the characteristics of said light transmitting means and said transmitted signal which have a complete range of time delays with respect to each other over the time period of said characteristics and said signal, said characteristics and said signal having delay points in this range, means multiplying said characteristics and said signal at each said delay point continuously over the time duration of said characteristics and said signal, means for integrating as a function of time the product of the multiplication at each said delay point.

14. A correlation device comprising light transmitting means having permanently recorded predetermined varying light transmitting characteristics which define a plurality of straight lines when exposed to a modulated light source and projected on a plane surface, said characteristics representing a reference signal having a time period and a complete range of time delays over said time period, means for transmitting a signal having about the same characteristics as said light transmitting means, means for receiving said signal, a light source, means for mounting said light source in spaced relation from said light transmitting means such that the light output illuminates the complete range of time delays of the permanently recorded light transmitting characteristics of said light transmitting means, means modulating the light intensity from said light source with the received signal, and means integrating as a function of time the light transmitted through the light transmitting means from the modulated light intensity from said light source at each of the points of time delay in said range of time delays.

15. A device for correlating a reference signal with a received signal having about the same wave form comprising means having permanently recorded sloping reference bands of predetermined light transmitting characteristics which define a wave form of a random noise signal, means responsive to light transmitted through such first mentioned means for transmitting the signal, means for receiving the transmitted signal, a source of light modulated by the received signal from last mentioned means, the modulated light being transmitted through said first mentioned means, vidicon means for integrating as a function of time the modulated light being transmitted through said first means.

References Cited by the Examiner

UNITED STATES PATENTS

| | | | |
|---|---|---|---|
| 2,664,243 | 12/1953 | Hurvitz | 235—181 |
| 2,787,188 | 4/1957 | Berger. | |
| 3,030,021 | 4/1962 | Ferre | 235—181 |
| 3,088,113 | 4/1963 | Rosenthal | 343—17.1 |
| 3,157,874 | 11/1964 | Altar et al. | 343—5 |

CHESTER L. JUSTUS, *Primary Examiner.*

R. A. FARLEY, *Assistant Examiner.*